United States Patent [19]

Jay, Sr. et al.

[11] Patent Number: 4,944,868
[45] Date of Patent: Jul. 31, 1990

[54] PROCESS AND APPARATUS FOR SEPARATING PLASTICS FROM CONTAMINANTS

[76] Inventors: Jerry L. Jay, Sr., Rte. 3 #3, Box 239; Ben Cottrell, Rte. 3 #3, Box 313, both of Newbern, Tenn. 38059

[21] Appl. No.: 227,604

[22] Filed: Aug. 28, 1988

[51] Int. Cl.$^5$ .............................................. B03B 5/28
[52] U.S. Cl. ........................................ 209/10; 209/12; 209/138; 209/173; 134/25.1; 134/72; 134/73; 134/131
[58] Field of Search ............... 210/770, 772, 143, 201, 210/241, 523, 524, 525, 160, 216, 400, 406, 409, 771; 209/10, 173, 147, 136, 137, 138, 139.1, 470, 172.5, 454, 461, 12; 134/65, 68, 72, 73, 75, 131, 132, 25.1, 25.4, 25.5

[56] References Cited

U.S. PATENT DOCUMENTS

| | | | |
|---|---|---|---|
| 532,600 | 1/1895 | Simon | 134/65 |
| 2,266,937 | 12/1941 | Tark | 210/772 |
| 2,517,117 | 8/1950 | Komline | 210/525 |
| 2,635,104 | 4/1953 | Chayen | 210/523 |
| 2,667,881 | 2/1954 | Watkins et al. | 134/131 |
| 3,568,839 | 3/1971 | Dunlea, Jr. | 210/525 |
| 4,052,311 | 10/1977 | Martin | 210/523 |
| 4,119,533 | 10/1978 | Saitoh et al. | 209/173 |
| 4,191,201 | 3/1980 | Barnsbee | 209/173 |
| 4,274,963 | 6/1981 | Purvis | 210/523 |
| 4,294,695 | 10/1981 | Smith et al. | 210/525 |
| 4,364,222 | 12/1982 | Ramacher | 209/147 |
| 4,707,277 | 11/1987 | Mims | 210/525 |
| 4,728,045 | 3/1988 | Tomaszek | 209/173 |
| 4,755,284 | 7/1988 | Brooks et al. | 209/139.1 |
| 4,809,854 | 3/1989 | Tomszek | 209/173 |
| 4,830,188 | 5/1989 | Hannigan et al. | 209/173 |

Primary Examiner—W. Gary Jones
Assistant Examiner—Matthew O. Savage

[57] ABSTRACT

A process and apparatus for separating plastics from contaminants which includes a separation tank, a wash tank, a rinse tank, a lift conveyor, and a material dryer is disclosed. The separation tank is filled with a separation solution and includes a discharge auger for discharging material that sinks and a discharge chute for discharging materials that float. The separation tank may be rotated so that sink or float materials may be alternately deposited in the wash tank. The wash tank is filled with a wash solution and includes a discharge auger for discharging material from the wash tank into a rinse tank. The rinse tank is filled with a rinse solution and includes a discharge auger for discharging material to a lift conveyor. Both the wash and rinse tanks include adjustable front and rear legs, and a center support leg for adjusting the solution level in relation to their respective discharge augers for optimizing washing or rinsing of either float or sink materials. The lift conveyor transfers material from the rinse tank to a material dryer. Lift conveyor may be converted so as to provide an additional rinsing step, or an aspiration step.

6 Claims, 8 Drawing Sheets

PROCESS AND APPARATUS FOR SEPARATING PLASTICS FROM CONTAMINANTS

The Controlled Density Decontamination and Separation Machine is primarily designed for the efficient separation and decontamination of salvageable materials, such as commercial polymers that often become contaminated with foreign materials or each other, or are otherwise combined in normal manufacturing processes, rendering them useless to salvagers of these materials and becoming a nonbiodegradable landfill problem.

This Controlled Density Decontamination and Separation Machine, heretofore in this description to be referred to as the machine, will provide salvagers of these and other materials that become contaminated or combined, in such a way as to render them useless, a means of separating and decontaminating materials efficiently and in volumes high enough to make it practical and profitable to salvage materials that have been traditionally discarded and it will increase the volume of materials that have been traditionally profitable to decontaminate and separate to such a level to make it more profitable and practical for salvagers thereby providing for increased interest in salvaging materials and reprocessing them instead of discarding them.

A polymer is non biodegradable and presents a serious landfill problem when discarded and a serious air pollution problem when incinerated. The machine that we have designed will help greatly to relieve these problems and turn them into new products profitably.

FIG. 1 shows the separation unit with the supply auger in place including the separation tank 1 and the supply auger 2.

Figure 1:
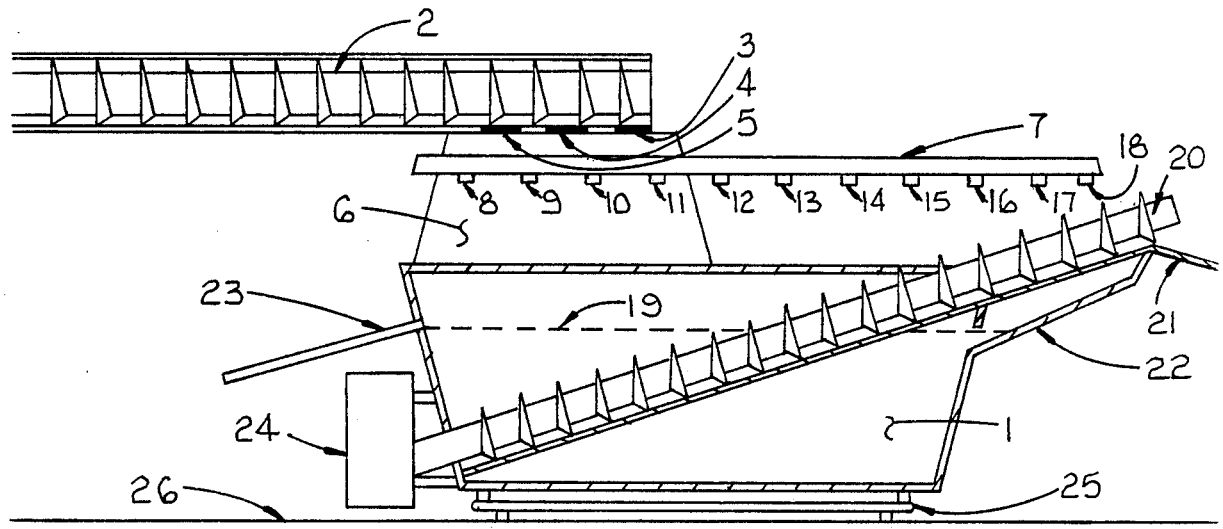
FIG. 1 shows a cutaway view of the separation tank with the supply auger and spray nozzles in place and demonstrating the disposition of the discharge auger.

The contaminated material, such as, polyethylene and polyethylene terephthalate, which are used widely in products such as beverage bottle-base cup combinations, is carried down the supply auger in a controlled manner and presented to the dispersement ports 3–5 and is deposited onto the supply slide ramp 6.

Fluid pressure line 7 can be solvent or city water or any solution and is provided with adjustable, directional orifices 8–18.

Orifices 8–11 serve as a pre-wetting device and a motive force for insuring a steady flow of material down the supply ramp 6, and the contaminated material is then dropped into the separation solution in the separation tank which has a controlled level 19, and a controlled density, which can be changed for different materials.

In the event that you have two salvageable materials that are combined, and have to be separated, by adjusting the density or viscosity of the solution in the separation tank one, will be allowed to sink and the other to float on the surface, thereby separating the two materials, which with the machine that we designed, can both be saved simultaneously if required or separately, if desired.

In the event that you have one material that is contaminated with several others one can be separated and the others can be stored for further separation if desired.

The material that is allowed to sink is carried out of the separation tank by the action of the separation tank auger 20, which is operated in a synchronized manner, in relation to the supply auger 2, and powered by drive unit 24.

The material that is allowed to float on the surface is carried out of the float discharge chute 23, by the action of controlled overflow, and eddie currents created by the action of the directional spray orifices 12–18, on the surface of the separation solution 19.

The sink material is carried out of the separation tank by the action of the separation tank auger 20, to the separation tank discharge chute 21. With this process, at high volumes, some of the separation solution may be carried out with the material. In the event that this is not desireable the separation tank is provided with a positive drag out return chute 21, which will allow any drag out solution to return to the separation tank.

Figure 2:
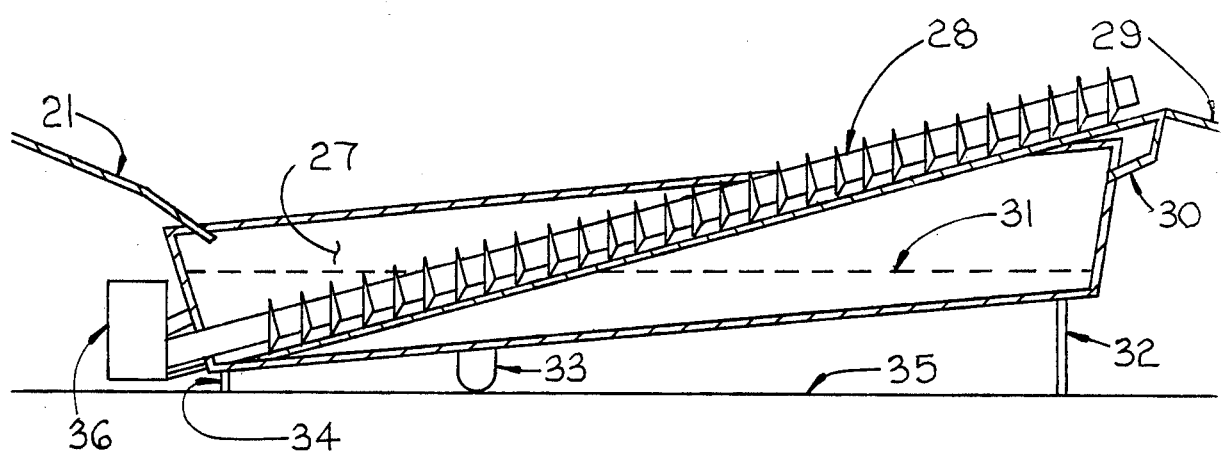
FIG. 2 shows a cutaway view of the wash tank demonstrating the disposition of the auger.

If in the event that the float material is to be saved the separation tank can be rotated by the action of a rotating mount 25, which is securely mounted to the floor 26, bringing the float discharge chute in line with the wash tank shown in FIG. 2.

The material from the separation tank coming down the separation tank discharge chute 21, FIG. 2, is deposited into the wash tank 27, and is carried out of the wash solution by the action of the wash tank auger 28 to the wash tank discharge chute 29. The wash tank is provided with a positive drag out return chute 30, so that any wash solution carried out with the material by the action of the wash tank discharge auger may be returned to the wash tank instead of continuing down the process line, which will prevent any undesirable contamination of the rinse solution in the rinse tank 37 in FIG. 3.

The level of the wash solution 31, will remain constant with the level of the floor line 35. The auger 28 will also have a constant level and will be driven at a constant synchronized speed, in relation to the separation tank auger 20, and the separation tank supply auger 2, by the action of the wash tank auger drive unit 36.

However, depending on the application, the wash solution level may be changed, in relation to the auger, to allow maximum material/solution exposure, by manipulating the adjustable front and rear legs 32, 34 in relation to the pivot leg 33 thereby changing the solution level 31 in relation to the discharge auger 28 so that the discharge auger is more or less submerged in the wash solution, facilitating either scraping of the bottom or skimming of the top, which ever is applicable, depending on what materials are being salvaged.

Figure 3:
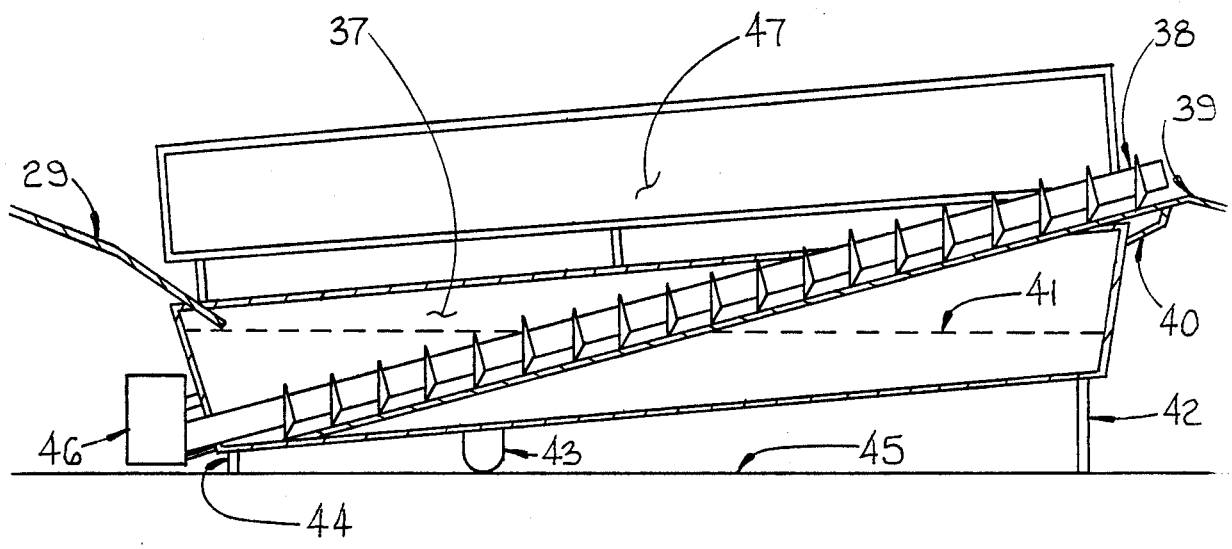
FIG. 3 shows a cutaway view of the rinse tank demonstrating the disposition of the auber and optional lid.

The material after being washed is deposited onto the wash tank discharge chute 29, and transferred to the rinse tank 37 shown in FIG. 3.

The rinse tank 37 shown in FIG. 3, is much like the wash tank 27, but performs a necessary and essential function and is considered a separate unit. However the wash and rinse units can be interchangeable adding to the versatility and user practicality of this machine.

The rinse tank 37, is supplied with material by the wash tank discharge chute 29, and the material is deposited in rinse solution and carried thru the rinse solution by the action of the rinse tank auger 38, which is powered by the rinse tank auger drive unit 46, which is controlled in a synchronized manner in relation to the supply auger 2, the separation tank auger 20, and the wash tank auger 28 thereby providing a constant and steady flow of material without pile ups or breaks in flow.

The rinse tank is also provided with a discharge chute 39, and a drag out return chute 40, the rinse tank solution level 41, will remain constant, in relation to the floor line 45, but can be changed in relation to the discharge auger 38, by manipulating the front and rear adjustable legs 42, 44, in relation to the pivot leg 43 so that the auger is more or less submerged in the rinse solution depending on application needs.

The rinse tank is also provided with a lid which can be optional on this or any of the tanks depending on customer needs.

Figure 4:
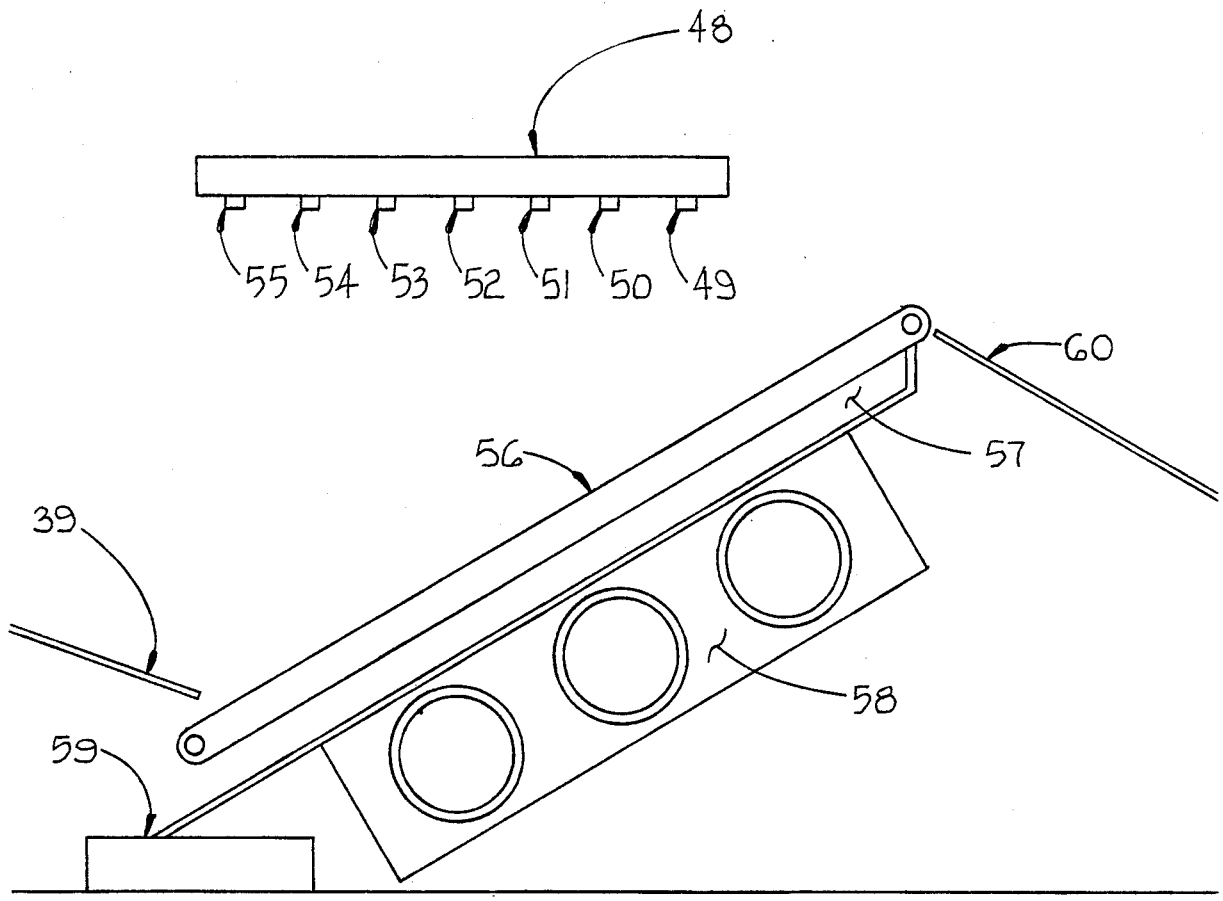
FIG. 4 shows a side view of the lift conveyor of with the blower section and spray nozzles in place.
Figure 6:
FIG. 6 shows a side view of the shroud pan liner which is used in the event that the final spray rinse is desired.
Figure 7:
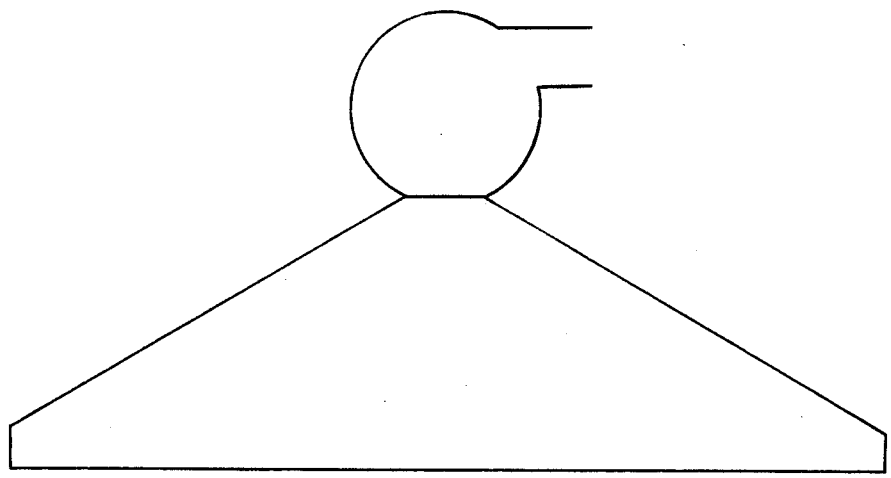
FIG. 7 shows a side view of a suction hood which is used in the even that aspiration is needed.
Figure 8:
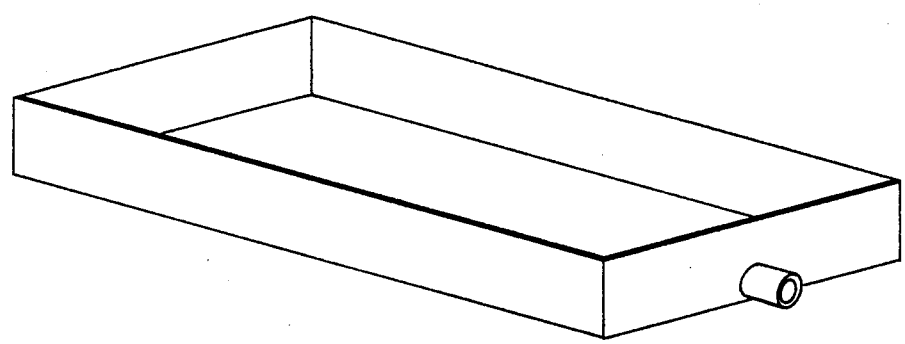
FIG. 8 shows an isometric view of the shroud pan liner shown in FIG. 6.

The material is then passed down the rinse tank discharge chute 39 to the lift conveyor 56, this section illustrated in FIG. 4, can be used either as a final rinse or an aspirator for fine particles, depending on customer needs. In the event that it is to be used as a final rinse the fluid pressure line 48 would be activated; it can be city water, solvent or any solution, providing a pressurized spray through the adjustable orifices 49-55, which would spray down through the material traveling up the conveyor. Perforations in the conveyor belt would allow rinse solution to pass through the belt into the conveyor shroud/pan 57, and by inserting the shroud/pan liner, shown in FIG. 6, the fluid would flow down the shroud/pan into the spray rinse return reservoir 59. In the event that this section be used as an aspirator for fine particles the shroud/pan liner would be removed and the blower section 58, would be activated blowing air up through the perforations in the conveyor belt lifting the fine particles and by replacing the fluid pressure line 48 with the suction hood shown in FIG. 7, these fine particles can be drawn off providing efficient aspiration.

Figure 5:
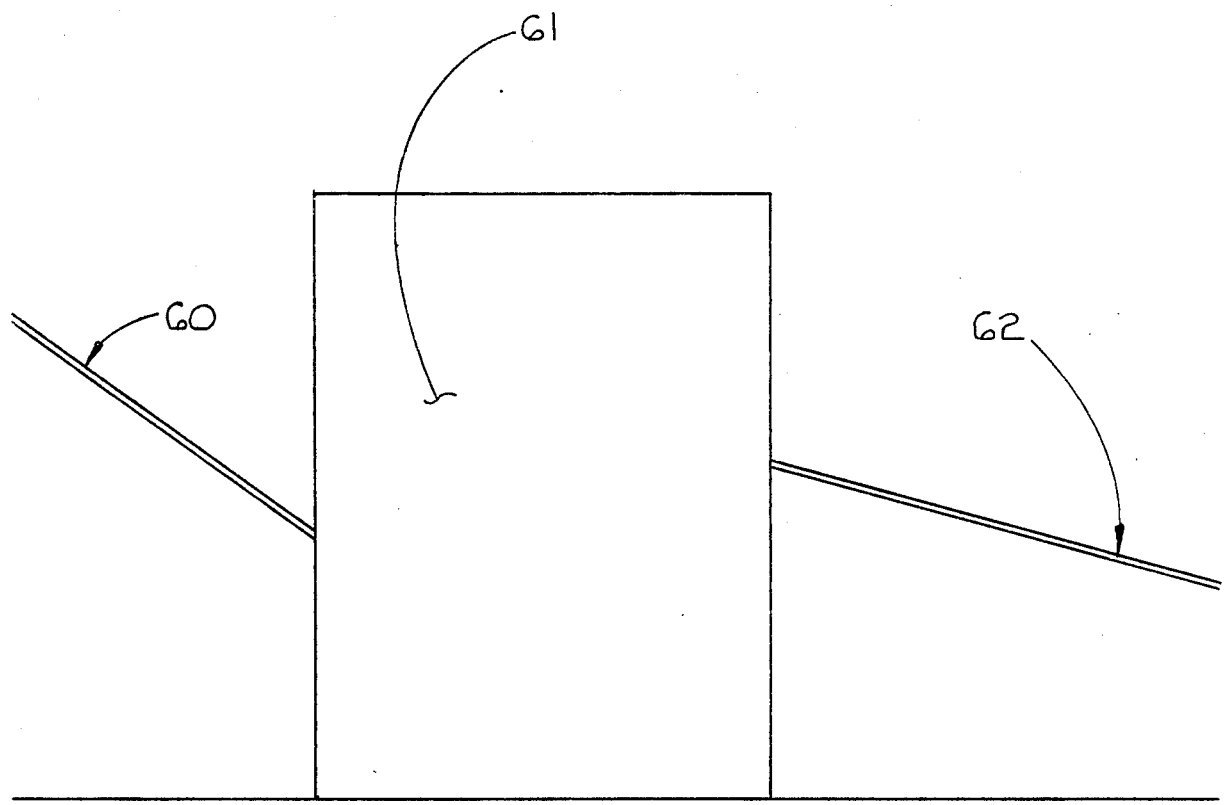
FIG. 5 shows the material dryer.

The material is then carried to the conveyor discharge chute 60 and is passed to the material dryer 61, shown in FIG. 5, which can be a centrifugal separation dryer of a hot air/desiccant dryer depending on customer needs. The material is passed through the dryer and out the dryer discharge chute 62, and is then ready for reuse or reprocessing depending on users application.

We claim:

1. A process for separating plastics from contaminants comprising the steps of: providing a supply auger for delivering contaminated plastic particles to a separation tank; the separation tank being equipped with a separation discharge auger that will discharge materials that sink and a discharge chute that will discharge particles that float, and is filled with a separation solution; rotating the wash tank to deposit either sink or float material into a wash tank; the wash tank being filled with a wash solution for cleaning any dirt or residue remaining on the particles after separation; the wash tank being supplied with a wash tank discharge auger to carry the particles through and out of the wash tank to a rinse tank; providing front, rear, and center support legs for the wash tank; adjusting the level of the wash solution in relation with the wash tank discharge auger by adjusting the front and rear legs in relation to the center leg so that the wash solution level will be altered, in relation to the auger, so that the auger is more or less submerged in the solution, to make it most efficient in transferring either sink or float materials through and out of the wash tank to the rinse tank; the rinse tank being filled with a rinse solution for rinsing away any residue remaining on the particles from the wash tank; the rinse tank being supplied with a rinse tank discharge auger to carry the particles through and out of the rinse tank to a lift conveyor; providing front, rear, and center support legs for the rinse tank; adjusting the level of the rinse solution in relation to the rinse tank discharge auger by adjusting the front and rear legs in relation to the center leg so that the solution level is altered, in relation to the auger, so that the auger is more or less submerged in the solution to make it most efficient in transferring sink or float materials to the lift conveyor; the lift conveyor transferring the material to a material dryer where it is dried and discharged ready for reuse or remanufacturing.

2. A process as in claim 1, in which the lift conveyor is supplied with a blower assembly that is attached to the bottom of it and a suction hood that is attached to the top of it so that air is forced up through the perforated belt, and the material on the belt, so that undesirable fine particles are lifted and drawn off by the suction hood to provide for optional aspiration.

3. A process as in claim 1, in which the lift conveyor is supplied with a drain pan which is attached to the bottom of the conveyor and a spray assembly which is attached to the top of the conveyor for spraying water down through the material, on the peforated belt, through the belt and into the drain pan which provided for an optional spray rinse.

4. An apparatus for the separation of contaminants from plastics comprising: a supply auger for delivering contaminated plastic particles to a separation tank; the separation tank being equipped with a discharge auger that will discharge materials that sink, and a discharge chute, that will discharge particles that float, and is filled with a separation solution; means for rotating the separation tank for depositing either sink or float material into a wash tank that is filled with a wash solution for cleaning any dirt or residue that may be on the particles after separation; the wash tank being supplied with a wash tank discharge auger to carry the particles fthrough and out of the wash tank to a rinse tank; the wash tank having front, rear, and center support legs; the wash tank including means for adjusting the level of the solution in relation to said wash tank discharge auger consisting of means for adjusting the front and rear legs in relation to the center support leg so that the solution level is altered in relation to level of the auger so that the auger is more or less submerged into the solution to make it most efficient in transferring either sink or float materials through and out of the wash tank to the rinse tank; the rinse tank being filled with a rinse solution for rinsing away any residue that may be left on the particles from the wash tank; the rinse tank being supplied with a rinse tank discharge auger to carry the particles through and out of the rinse tank to a lift conveyor; the rinse tank having front, rear, and center support legs; the rinse tank including means for adjusting the level of the rinse solution in relation to the rinse tank auger consisting of means for adjusting the front and rear legs in relation to the center support leg so that the solution level will be altered in relation to the level of the auger so that the auger is more or less submerged into the solution to make it most efficient in transferring sink or float materials to the lift conveyor; the lift conveyor transferring material from the rinse tank to a material dryer.

5. An apparatus as in claim 4 which the lift conveyor is supplied with a blower assembly that is attached to the bottom of it and a suction hood that is attached to the top of it so that air is forced up through the perforated belt, and the material on the belt, so that undesirable fine particles are lifted and drawn off by the suction hood to provide for optional aspiration.

6. An apparatus as in claim 4 in which the lift conveyor is supplied with a drain pan which is attached to the bottom of the conveyor, and a spray assembly, which is attached to the top of the conveyor for spraying water down through the material, on the perforated belt, through the belt, and into the drain pan which provides for an optional spray rinse.

* * * * *